April 12, 1960
T. P. FARKAS
2,932,176
CABIN TEMPERATURE CONTROL
Filed Feb. 28, 1957
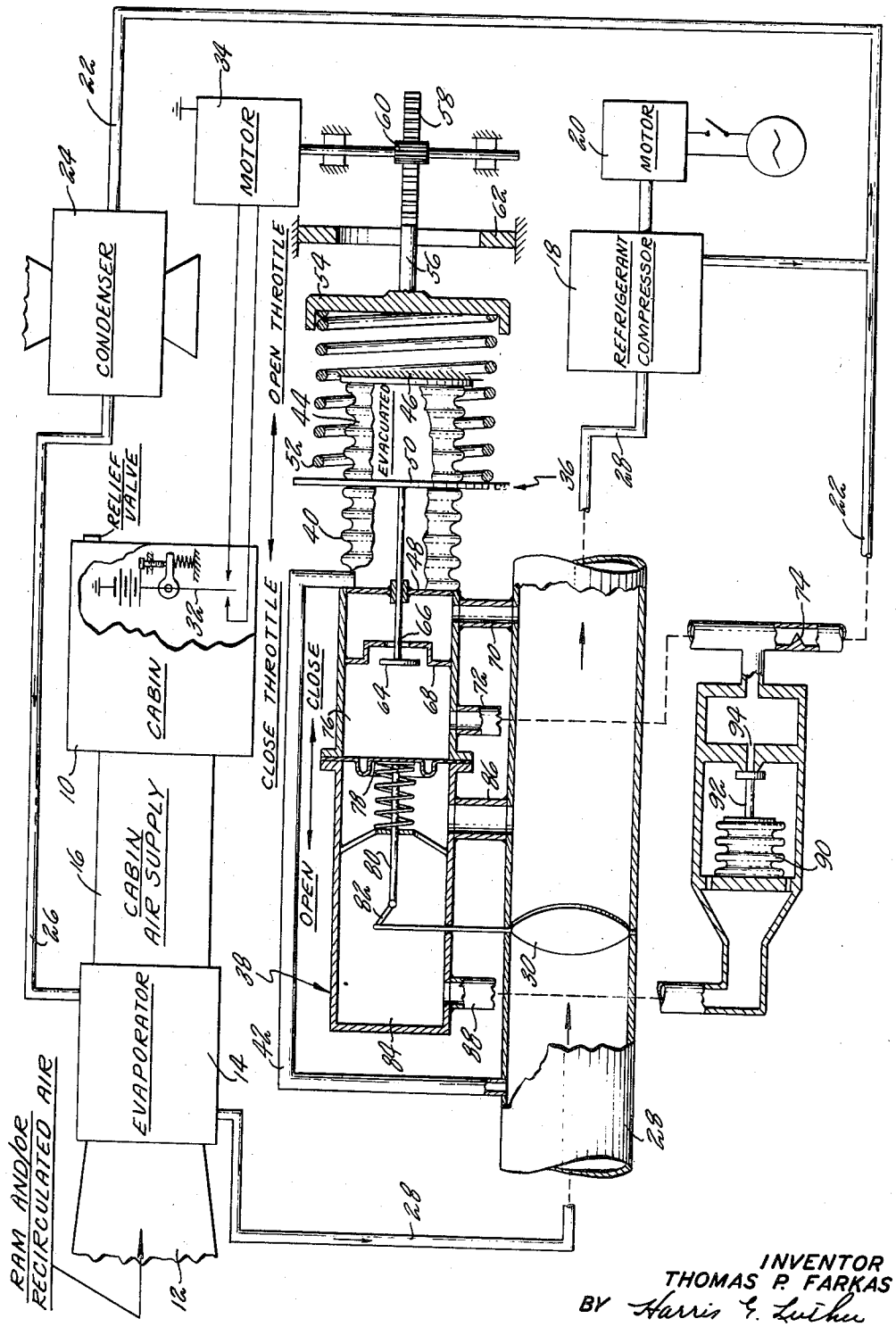
INVENTOR
THOMAS P. FARKAS
BY *Harris G. Luther*
ATTORNEY

United States Patent Office 2,932,176
Patented Apr. 12, 1960

2,932,176

CABIN TEMPERATURE CONTROL

Thomas P. Farkas, Bloomfield, Conn., assignor to United Aircraft Corporation, East Hartford, Conn., a corporation of Delaware Application February 28, 1957, Serial No. 643,082

10 Claims. (Cl. 62—209)

This invention relates to air conditioning mechanism and particularly to mechanism for controlling the cooling of enclosures.

More specifically, this invention relates to controlling the temperature of an airplane cabin by regulating the pressure maintained, by a pressure responsive valve, in a refrigerant evaporator utilized for cooling the cabin air supply.

An object of this invention is mechanism for accurately controlling cabin temperature.

A further object is mechanism for accurately controlling the pressure and hence the temperature in a refrigerant evaporator, utilized for cooling an enclosure.

A still further object is mechanism responsive to cabin temperature for maintaining cabin temperature by controlling the pressure setting of an evaporator pressure responsive valve controlling the pressure in an evaporator utilized for cooling the cabin.

Still another object is mechanism utilizing an evaporator pressure responsive valve for limiting the refrigerant compressor inlet pressure.

Other and further objects and advantages will be apparent from the following specification and the attached drawings in which:

The figure is a schematic drawing showing a cabin air conditioning mechanism including the control for the pressure regulating valve.

One of the problems in the air conditioning of airplane compartments is that of accurately maintaining a selected temperature with rapidly varying conditions to which an airplane is subjected. In an air conditioning system using a refrigerant evaporator for cooling the cabin air supply, the problem is one of maintaining the evaporator at the proper temperature to cool the incoming air the correct amount so that the resultant air temperature will provide the selected cabin air temperature.

The cabin air supply, especially for pressurized cabins, is usually air under pressure and a somewhat elevated temperature, which air must be cooled to bring it down to the desired temperature for the enclosure air supply. The quantity of air supplied is in accordance with a preselected schedule and maintains the flow substantially constant so as to give a preselected rate of change of cabin air and also maintain the preselected pressurization schedule as the ambient pressure changes.

As the cooling requirements vary materially with the change in ambient temperature and with the change in the pressure rise in the supercharger or the compressed air source furnishing the cabin air supply, it is necessary to vary the back pressure in the evaporator to thus vary the temperature maintained by the evaporator to provide the varying cooling requirements for the cabin air supply. If it is attempted to provide the change in requirements simply by operation of a throttle valve without reference to the pressure limitations, it is possible under some conditions to overload the refrigerant compressor and under other conditions to freeze up the cabin air supply portion of the evaporator. By utilizing the pressure control, forming the subject of this invention, a stop can be provided on the pressure regulator limiting the pressure change to a preselected amount which will prevent a reduction of temperature in the evaporator to such an extent as to cause freezing. Pressure responsive mechanisms can also be provided to prevent an increase in compressor inlet pressure to such an extent that the compressor would be overloaded.

Referring particularly to the drawings, an enclosure 10, which may be any portion of the airplane which it is desired to cool, and which for convenience in terminology has been indicated as an airplane cabin compartment, is supplied with air from any suitable source, not shown, which may be ram air or recirculated cabin air, or air from a supercharger or bleed air from a gas turbine compressor. The air supply is led through a duct 12 and through a heat exchanger 14 and a duct 16 to the cabin 10. The heat exchanger 14 has one set of passages for the cabin air supply and another set of passages forming an evaporator for a refrigerant used for cooling the cabin air supply. A refrigerant compressor 18 is driven by any suitable source of power, such as an electric motor 20 and discharges refrigerant gas under pressure through the line 22 to the condenser 24 where the gas is condensed to a liquid. The condenser is a heat exchanger and is cooled by air which may be either ram air or fan propelled air. The liquid is led through line 26 and through a suitable expansion valve, not shown, an evaporator 14 and then through line 28 back to the compressor inlet, completing the refrigerant cycle. A throttle valve 30 of any suitable type, but which is shown as a butterfly valve, controls the flow of low pressure refrigerant gas through the line 28 and thus serves as a restriction controlling the pressure or back pressure in the evaporator 14. The preferred refrigerant is one of the Freons, preferably Freon 114 whose temperature will vary in accordance with the pressure maintained in the evaporator. Hence, by operating valve 30 to maintain a selected pressure in the evaporator, it is possible to maintain a selected temperature in the Freon evaporator.

A thermostat 32 located in the compartment to be controlled and shown as located in the cabin 10, controls a servo motor 34 which is shown as a reversible electric motor to actuate mechanism which will set the pressure selecting mechanism for valve 30 and thus select the temperature to be maintained in evaporator 14 to give the cabin 10 a temperature selected by the thermostat 32. The pressure regulating mechanism for actuating the valve 30 comprises a pressure responsive section 36 and a servo section 38. The pressure responsive section has a bellows or capsule 40 connected by line 42 with the line 28 upstream of the throttle 30, between the throttle 30 and the evaporator 14, to sample the evaporator pressure. An opposing evacuated bellows 44 has one end 46 fixed to the same support as the end 48 of the bellows 40 and the other end of the bellows 44 is fixed to a common dividing wall 50 between the bellows 40 and 44 to which one end of the bellows 40 is also fastened. A compression spring 52 extends between the common dividing wall 50 and an adjustable abutment 54 which has an extension 56 projecting therefrom on which is formed a rack 58 meshing with a gear 60 driven by motor 34. The pressure in bellows 40 is balanced against spring 52. A stop 62 limits the movement of abutment 54 in one direction to thereby limit the low pressure which may be obtained by movement of the valve 30. By thus limiting the low pressure, the low temperature is limited. The pressure is preferably selected so that the low temperature will not go below about 35° and thus freezing will be prevented.

The common dividing wall 50 carries a valve 64 which controls a bleed 66 across a fixed wall 68. The space at one side of the wall 68 is connected through a pipe 70 with the pipe 28 downstream of the valve 30, between the valve 30 and the inlet of the compressor 18. The other side of the wall 68 is connected by pipe 72 with the high pressure line 22 coming from the outlet of compressor 18. A restriction 74 in this line will limit the flow through the line 72 so that control of the bleed line 66 will control the pressure in the space 76 between the fixed wall 68 and a movable diaphragm 78.

Movable diaphragm 78 is connected by means of a stem 80 and crank 82 with the valve 30 for actuating the valve 30. The space 84 on the lefthand side of the diaphragm 78 is connected by pipe 86 with the compressor inlet line 28 between the valve 30 and the compressor inlet. The space 84 is also connected by a pipe 88 with the pipe 72 between the chamber 76 and the restriction 74. A bellows 90 is located in pipe 88 and is compressed whenever the pressure in chamber 84 which is, in effect, the pressure at the inlet of the refrigerant compressor 18, exceeds a predetermined amount. A valve 92, carried by bellows 90, controls a bleed line 94, and when opened by contraction of the bellows 90, will bleed gas from the chamber 76 to thus reduce the pressure in chamber 76 and act to move valve 30 toward a closed position. This action will override the action of bellows 40 and valve 64 and prevent the pressure at the inlet of compressor 18 from exceeding a preselected value determined by the setting of bellows 90 and thus prevent overloading of the compressor 18.

It will be apparent that actuation of the motor 34 will set the compression of spring 52 which will determine the pressure necessary in chamber 40, and the evaporator, to balance the spring force. Valve 64 will then be in a balanced position and will set the servo diaphragm 78 and the throttle valve 30 in the correct position to maintain the evaporator pressure and the pressure in bellows 40 at the balanced position. While a rack and a pinion have been shown as a means for adjusting the abutment 54, it will be apparent that any suitable non-reversing mechanism could be used, or if the spring 52 were strong enough to move the motor 34, a brake could be provided for holding the selected position.

*Operation*

When the thermostat 32 calls for a reduction in temperature, indicating that the cabin is too warm, motor 34 will be operated to relieve the compression in spring 52 moving valve 64 to the right and reducing the opening of bleed opening 66. Reducing the bleed 66 will cause an increase in pressure in chamber 76 and move diaphragm 78 to the left, opening valve 30 and reducing the back pressure in line 28 and the evaporator 14 to thus reduce the evaporator temperature and reduce the temperature of the air being fed to the cabin. The extent of the pressure reduction is limited by stop 62 to limit the evaporator low temperature to about 35°. Reducing the back pressure in line 28 will reduce the pressure in bellows 40 and thus tend to stabilize the position of valve 66 by counteracting the effect of the relieved tension in the spring 52.

Opening of the throttle 30 has a tendency to increase the pressure in the refrigerant compressor 18 inlet. The increased suction pressure of the compressor inlet, when it exceeds a preselected value, will open the normally closed valve 92 and thus bleed some gas from the chamber 76. Chamber 84, being freely open to the pipe 28, will not have its pressure changed by the opening of the valve 92. Opening of valve 92 will, however, provide an additional bleed for chamber 76 and reduce the pressure on the right side of the diaphragm 78; thus effecting a closing of the throttle 30 and a reduction in suction pressure by restricting the flow in line 28 to unload the refrigerant compressor and thus prevent an overload on the compressor. Closing the throttle 30 to reduce the compressor inlet pressure will tend to increase the pressure in the evaporator and upstream of the valve 30 which will be reflected through line 42 and into the bellows 40 and tend to close the valve 64 and restrict bleed 66 and tend to increase the pressure in chamber 76; thus opposing the reduction in pressure in chamber 76 initiated by the opening of bleed valve 92. These two opposing forces will soon stabilize at an intermediate position with the suction pressure to the compressor limited to a predetermined amount.

Although only one embodiment has been shown and described herein, it will be apparent that various changes and modifications may be made in the construction and arrangement of the various parts without departing from the scope of this novel concept.

I claim:

1. In an air conditioning system for an airplane compartment, a source of air supply for said compartment, a heat exchanger for cooling air flowing from said source to said compartment, a supply of refrigerant for said heat exchanger, including a compressor having an inlet connected with the outlet of the refrigerant section of said heat exchanger, a valve in the connection between said heat exchanger and said compressor controlling the refrigerant pressure in said heat exchanger, means responsive to variation in said pressure from a selected pressure for actuating said valve, means responsive to compartment temperature for selecting the pressure setting of said pressure responsive means, means responsive to inlet pressures of said compressor above a selected value and means actuated by said inlet pressure responsive means for modifying the valve actuation by said pressure variations.

2. In a refrigerator system having a compressor, an evaporator, and a variable restriction in a conduit connecting the outlet of the evaporator with the inlet of said compressor, an enclosure cooled by said evaporator, means responsive to the temperature of said enclosure, servo mechanism for varying said restriction, means responsive to the pressure in said evaporator outlet upstream of said restriction for actuating said servo to maintain said pressure at a selected value, and a motor controlled by said temperature responsive means selecting said value by biasing the setting of said pressure responsive means, means responsive to the pressure in said inlet downstream of said restriction and means actuated by said inlet pressure responsive means modifying the actuation of said servo mechanism by said outlet pressure responsive means and limiting the rise in pressure in said inlet.

3. In combination, a refrigerant compressor, an evaporator, a valve connecting the exit of said evaporator with the inlet of said compressor, means responsive to the refrigerant pressure at said evaporator exit, means responsive to the refrigerant pressure at said compressor inlet, means operatively connecting said exit pressure responsive means with said valve to maintain said exit pressure at a selected value and means operatively connecting said inlet pressure responsive means with said valve to limit the rise in pressure in said inlet and prevent overloading of said compressor, pressure responsive means for actuating said valve and means controlled by the evaporator pressure responsive means and by the compressor inlet pressure responsive means controlling the pressure in said valve actuating pressure responsive means by bleeding fluid from said valve actuating pressure responsive means.

4. A combination as claimed in claim 3 in which said valve actuating pressure responsive means includes a pressure chamber, means directing a limited flow of pressure fluid to said chamber, valve means controlled by the evaporator pressure controlling the flow of pressure fluid from said chamber to control the chamber pressure and valve means controlled by the compressor inlet pressure also controlling the flow of fluid from said chamber to control the chamber pressure.

5. A combination as claimed in claim 2 in which the means responsive to the evaporator pressure includes a movable wall urged in one direction by said evaporator pressure and in the other direction by a spring and biasing means moved by said motor adjusting the spring force of said spring and a stop limiting the spring force reducing movement to limit the low temperature of said enclosure.

6. A combination as claimed in claim 4 in which the pressure fluid is the refrigerant and in which the valve means are actuated by the refrigerant at the indicated controlling pressure.

7. In a refrigerating system for controlling the temperature of an enclosure including a refrigerant compressor connected with an evaporator which is in heat transferring relation with said enclosure, means responsive to the enclosure temperature controlling flow control means in the connection between said compressor and said evaporator, means responsive to an operating condition of the evaporator also controlling flow control means in the connection between said compressor and said evaporator and means responsive to an operating condition of said compressor overriding said temperature responsive and evaporator condition control.

8. In a refrigerator system having a compressor, an evaporator, and a variable restriction in a conduit connecting the outlet of the evaporator with the inlet of the compressor, an enclosure cooled by said evaporator, means responsive to the temperature of said enclosure, servo mechanism for varying said restriction, means responsive to an evaporator condition for actuating said servo to maintain the evaporator condition at a selected value, a motor controlled by said temperature responsive means selecting said value by biasing the setting of said condition responsive means, means responsive to an operating condition of said compressor and means actuated by said operating condition responsive means, modifying the actuation of said servo mechanism by said evaporator condition responsive means.

9. A device as claimed in claim 8 in which the operative condition of said compressor is the load on the compressor.

10. A device as claimed in claim 8 in which the evaporator condition is the evaporator outlet pressure.

References Cited in the file of this patent

UNITED STATES PATENTS

| | | |
|---|---|---|
| 1,238,051 | Peterson | Aug. 21, 1917 |
| 1,828,566 | House | Oct. 20, 1931 |
| 2,013,167 | Musto | Sept. 3, 1935 |
| 2,161,312 | Pritchard | June 6, 1939 |
| 2,401,144 | Dube | May 28, 1946 |
| 2,581,956 | Jones | Jan. 8, 1952 |
| 2,734,346 | Dickieson | Feb. 14, 1956 |
| 2,817,213 | Miner | Dec. 24, 1957 |